US010513196B2

(12) United States Patent
Liu et al.

(10) Patent No.: US 10,513,196 B2
(45) Date of Patent: Dec. 24, 2019

(54) METHOD AND DEVICE FOR CONTROLLING VEHICLE TO OUTPUT ASSISTING POWER

(71) Applicant: Beijing Xiaomi Mobile Software Co., Ltd., Beijing (CN)

(72) Inventors: Huayijun Liu, Beijing (CN); Ke Wu, Beijing (CN); Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 130 days.

(21) Appl. No.: 15/844,979

(22) Filed: Dec. 18, 2017

(65) Prior Publication Data

US 2018/0170212 A1 Jun. 21, 2018

(30) Foreign Application Priority Data

Dec. 20, 2016 (CN) .......................... 2016 1 1195294

(51) Int. Cl.
*B60L 15/28* (2006.01)
*B62M 6/45* (2010.01)
(Continued)

(52) U.S. Cl.
CPC .............. *B60L 15/28* (2013.01); *B60L 50/20* (2019.02); *B60W 10/08* (2013.01); *B60W 20/15* (2016.01); *B62M 6/45* (2013.01); *B62M 6/50* (2013.01); *B60L 2200/12* (2013.01); *B60L 2240/423* (2013.01); *B60L 2250/16* (2013.01); *B60W 30/18172* (2013.01); *Y02T 10/7258* (2013.01)

(58) Field of Classification Search
CPC ......... B29C 43/46; B29C 43/56; B29C 43/22; B29C 55/08; B29C 2043/567; B29C 2043/464; B29C 2043/561; A61F 13/15804; A61F 13/15731; A61F 13/15707; B26F 1/24; B26F 1/20; B29K 2995/0092; B29L 2031/4878; B26D 2001/006
See application file for complete search history.

(56) References Cited

U.S. PATENT DOCUMENTS 5,742,491 A 4/1998 Bowman
5,892,139 A 4/1999 Miyazaki
(Continued)

FOREIGN PATENT DOCUMENTS

EP 2860096 A1 4/2015
JP H11351947 A 12/1999
WO 2013076902 A1 5/2013

OTHER PUBLICATIONS

European Office Action from corresponding EP Patent Application No. 17208360 dated May 25, 2018, 37 pages.
(Continued)

*Primary Examiner* — Thomas Ingram
(74) *Attorney, Agent, or Firm* — Arch & Lake LLP

(57) ABSTRACT

A method and a device are provided for controlling a vehicle to output an assisting power. The method includes: obtaining a friction force between the vehicle and ground; determining a target assisting power of the vehicle according to the friction force; and controlling a motor of the vehicle to output the target assisting power. By technical solutions of the present disclosure, it may enable the vehicle to adapt to different ground and adjust the assisting power outputted by the motor automatically.

18 Claims, 6 Drawing Sheets

(51) Int. Cl.
*B60L 50/20* (2019.01)
*B60W 20/15* (2016.01)
*B60W 10/08* (2006.01)
*B62M 6/50* (2010.01)
*B60W 30/18* (2012.01)

(56) References Cited

U.S. PATENT DOCUMENTS

| | | |
|---|---|---|
| 6,288,919 B1 | 9/2001 | Jain |
| 2002/0027026 A1 | 3/2002 | Hong |
| 2014/0062351 A1* | 3/2014 | Spelta .................. B60L 15/2009 318/139 |
| 2016/0304157 A1 | 10/2016 | Craven |
| 2017/0313380 A1* | 11/2017 | Corno ..................... B62M 6/45 |
| 2018/0257740 A1* | 9/2018 | Kikkawa .................. B62M 6/50 |

OTHER PUBLICATIONS

Jin-Shyan Lee et al: "Design and simulation of control systems for electric-assist bikes", 2016 IEEE 11th Conference on Industrial Electronics and Applications (ICIEA), Jun. 1, 2016 (Jun. 1, 2016), pp. 1736-1740.
First office action issued in corresponding in Chinese Application No. 201611195294.3, dated Oct. 8, 2018, 10 pages.

\* cited by examiner

METHOD AND DEVICE FOR CONTROLLING VEHICLE TO OUTPUT ASSISTING POWER

CROSS-REFERENCE TO RELATED APPLICATION

This application is based on and claims a priority to Chinese Patent Application No. 201611195294.3, filed on Dec. 20, 2016, the entire contents of which are incorporated herein by reference.

TECHNICAL FIELD

The present disclosure generally relates to a vehicle control field, and more particularly, to a method and a device for controlling a vehicle to output an assisting power.

BACKGROUND

With the rapid development of science and technology, a moped such as an electric scooter, a balance car and a motorized bicycle enter lives of people gradually.

Taking the motorized bicycle as an example, in the related art, when a user is riding it, by detecting a human driving force received by the motorized bicycle from the user, a motor is driven to output an assisting power according to a preset proportion to the human driving force to assist the user to ride. The motorized bicycle provides a variety of assisting power modes for the user to select, and the preset proportion between the assisting power outputted by the motor and the human driving force varies with the assisting power mode.

SUMMARY

According to a first aspect of the present disclosure, there is provided a method for controlling a vehicle to output an assisting power, including: obtaining a friction force between the vehicle and ground; determining a target assisting power of the vehicle according to the friction force; and controlling a motor of the vehicle to output the target assisting power.

According to a second aspect of the present disclosure, there is provided a device for controlling a vehicle to output an assisting power, including: a processor, and a memory configured to store instructions executable by the processor. The processor is configured to obtain a friction force between the vehicle and ground, determine a target assisting power of the vehicle according to the friction force, and control a motor of the vehicle to output the target assisting power.

According to a third aspect of the present disclosure, there is provided a non-transitory computer readable storage medium, when instructions in the storage medium are executed by a controller of a mobile terminal, the mobile terminal can execute the method for controlling the vehicle to output an assisting power, and the method includes: obtaining a friction force between the vehicle and ground; determining a target assisting power of the vehicle according to the friction force; and controlling a motor of the vehicle to output the target assisting power.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
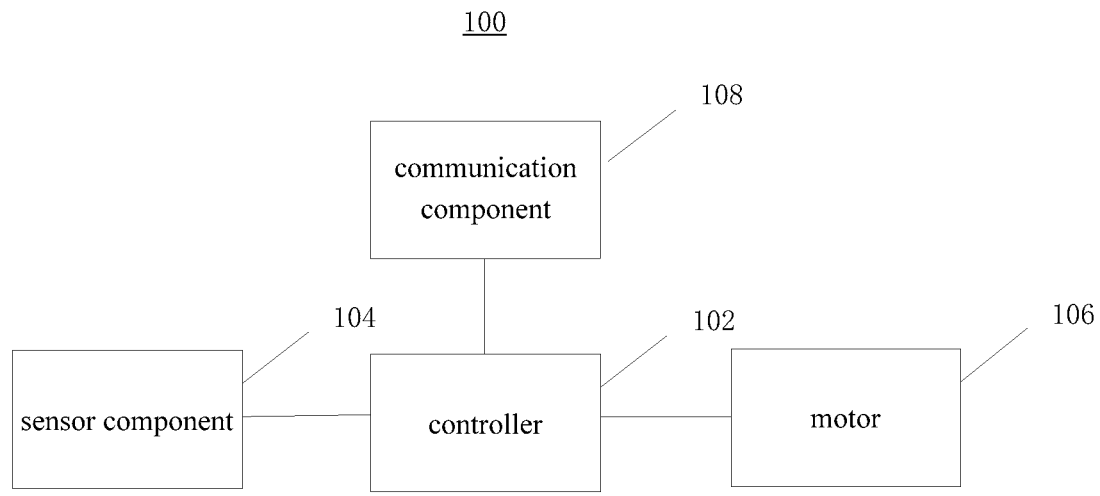
FIG. 1 is a schematic diagram illustrating a vehicle according to an aspect of the disclosure.

FIG. 1 is a schematic diagram illustrating a vehicle according to an aspect of the disclosure. In the present disclosure, the vehicle may include, but may be not limited to, such as an electric scooter, a balance vehicle, a motorized bicycle, a car and the like. As illustrated in FIG. 1, the vehicle 100 includes a controller 102, a sensor component 104, a motor 106 and a communication component 108. The sensor component 104 may include a friction sensor disposed at least partially on a wheel of the vehicle. The sensor component 104 may further include a speed sensor disposed on the body of the vehicle. In addition, the vehicle 100 further includes a pedal, wheels, a power module and the like, which are not illustrated.

In an embodiment, the sensor component 104 may include, but may be not limited to, such as a torque sensor and a friction sensor. When a user drives the vehicle 100, the friction sensor placed on the wheel collects a friction force between the vehicle and ground, and sends the friction force to the controller 102. The controller 102 determines a target assisting power matching with the friction force according to the friction force, and controls the motor 106 to output the target assisting power. The target assisting power outputted by the motor 106 and a human driving force to the vehicle drive the wheels to rotate, and control the vehicle to travel.

In addition, the sensor component 104 may further include a speed sensor. When the vehicle is running, the speed sensor can collect a driving speed of the vehicle and send it to the controller 102. The controller 102 determines the target assisting power of the vehicle according to the human driving force to the vehicle, the friction force and the collected driving speed, and controls the motor of the vehicle to output the target assisting power.

Figure 2:
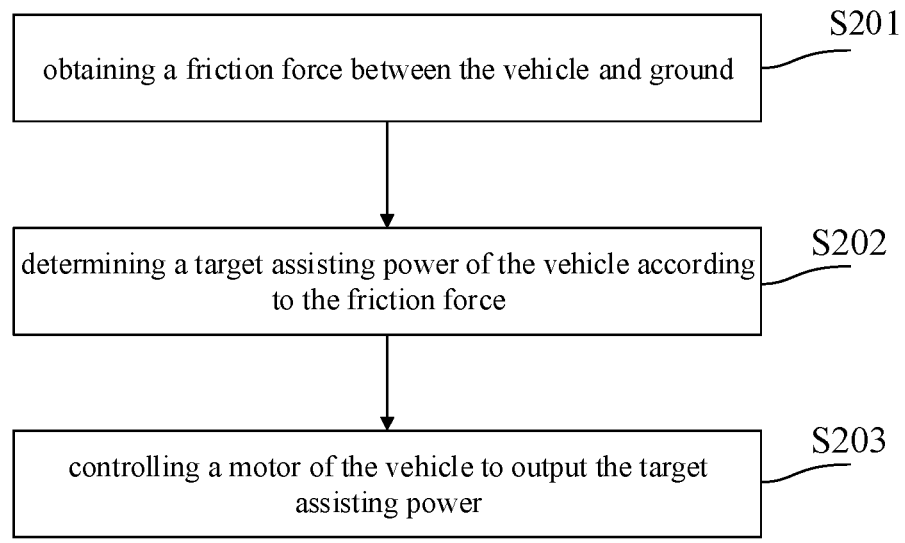
FIG. 2 is a flow chart illustrating a method for controlling a vehicle to output an assisting power according to an aspect of the disclosure.

FIG. 2 is a flow chart illustrating a method for controlling a vehicle to output an assisting power according to an aspect of the disclosure. The method may be applied to a device for controlling the vehicle, and the device for controlling the vehicle may include, but may not be limited to, such as a vehicle and other terminal device (such as a mobile phone, a computer, etc.). Referring to FIG. 2, the method includes block S201 to block S203.

In block S201, a friction force between the vehicle and ground is obtained. The friction force may be detected by one or more friction sensors on the vehicle. The vehicle may include a manual power source and an electric motor working alternatively or simultaneously. The manual power source may include a foot pedal, etc. The output of the electric power from the electric motor may be dependent on the amount of manual power caused by manual force.

In block S202, a target assisting power of the vehicle is determined according to the friction force. The device may determine the target assisting power based on a pre-stored table or relationship between target assisting powers and different friction forces.

In block S203, a motor of the vehicle is controlled to output the target assisting power. The device may send an instruction to at least one motor of the vehicle to adjust its output so that the desired assisting power is generated. The motor may be an electric motor in the vehicle.

In one or more embodiments, when the vehicle is running, the friction force between the vehicle and the ground can be collected by the sensor component (such as the friction sensor). The sensor component can be arranged on the vehicle.

When the vehicle runs on different ground, the friction force between the vehicle and the ground is different. Taking an electric motorized bicycle as an example, an output power of the vehicle is controlled by the human driving force received by the pedal of the vehicle and the assisting power outputted by the motor. For example, on rough roads, the friction force between the vehicle and the ground is large, and the user needs to pedal hard to increase the driving force, or change to a higher gear to increase the assisting power, so as to increase the output power of the vehicle. On smooth roads, the friction force between the vehicle and the ground is small, and the user needs to pedal gently to decrease the driving force, or change to a lower gear to decrease the assisting power, so as to decrease the output power of the vehicle, thereby passing the ground easily.

In this embodiment, the target assisting power matching with the friction force may be obtained according to different friction force, and a corresponding control instruction is generated according to the target assisting power to control the motor to output the target assisting power.

It should be noted that, in embodiments of the present disclosure, the friction force between the vehicle and the ground may be obtained using an average of the friction forces between the vehicle and the ground within a preset time period (or within a preset distance).

By technical solutions of the present disclosure, the assisting power of the vehicle is adjusted according to the friction force between the vehicle and the ground, thereby enabling the vehicle to adapt to different ground and adjust the assisting power of the motor automatically. It enables the vehicle to avoid the user from losing balance and falling down because of underpowered output when driving on the rough ground, thereby reducing a hidden danger. The motor does not need to output a larger assisting power when driving on the smooth ground, thereby improving a cruising ability of the vehicle, extending a service life of a battery module, and improving the user experience.

In the present disclosure, for the block S202, according to the friction force between the vehicle and the ground, the target assisting power of the vehicle can be determined by any of following four ways. Then, the four ways of determining the target assisting power are described in four embodiments, respectively.

Figure 3:
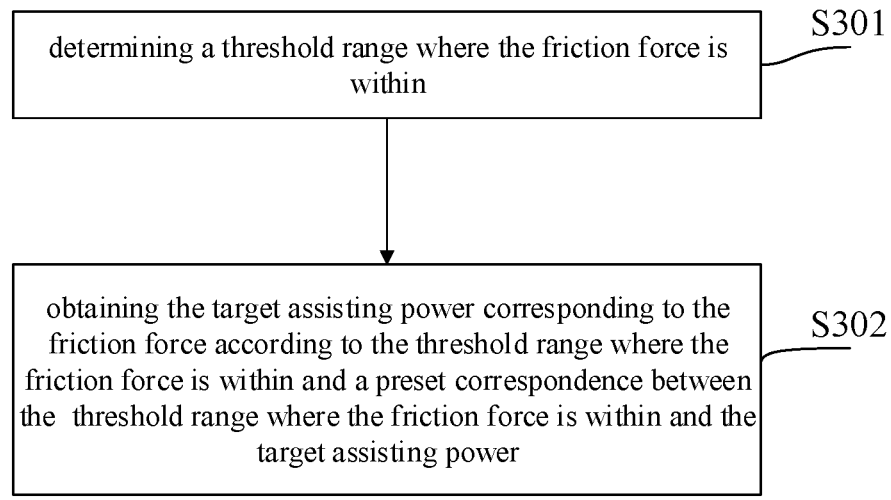
FIG. 3 is a flow chart illustrating a method for controlling a vehicle to output an assisting power according to an aspect of the disclosure.

Referring to FIG. 3, in an embodiment, a first way of determining the target assisting power includes block S301 and block S302.

In block S301, a threshold range where the friction force is within is determined.

In block S302, according to the threshold range where the friction force is within and a preset correspondence between stored threshold ranges and stored target assisting powers, the target assisting power corresponding to the friction force is obtained. The stored threshold ranges and stored target assisting powers may be stored in a local or remote database.

In this embodiment, there are three grades for a smoothness grade of the ground: high, middle and low. For different smoothness grades, different threshold ranges can be preset, and different amounts of assisting powers can be set within the different threshold ranges. By determining the threshold range where the friction force between the vehicle and the ground is within, a required target assisting power can be determined.

For example, when the friction force f between the vehicle and the ground is larger (that is, $f \in (f_2, f_1]$), it indicates that the ground is rougher, and it is determined that the smoothness grade of the ground is lower, and the power required for the vehicle to drive on the ground is larger. Therefore, a corresponding target assisting power $F_1$ can be set larger, so that the vehicle can pass easily without too much manpower (that is, the human driving force received by the vehicle), and it may avoid the user from losing balance and falling down because of underpowered output.

When the friction force f between the vehicle and the ground is smaller (that is, $f \in (f_4, f_3]$), it indicates that the ground is smoother, a corresponding smoothness grade of the ground is higher, and the power required for the vehicle to drive on the ground is lower. Therefore, a corresponding target assisting power $F_3$ can be set smaller ($F_3 < F_1$), so as to save an electric quantity of the battery module, enhance the cruising ability of the vehicle, and extend a service life of the battery module.

When the friction force $f \in (f_3, f_2]$ between the vehicle and the ground, it indicates that a roughness of the ground is moderate, and a corresponding smoothness grade of the ground is middle. Therefore, a corresponding target assisting power $F_2$ can be set between the target assisting power when the ground is rougher and the target assisting power when the ground is smoother, that is, $F_3<F_2<F_1$, as illustrated in Table 1.

According to the obtained threshold range where the friction force is within, the target assisting power corresponding to the friction force can be determined.

TABLE 1

| threshold range (unit: N) | smoothness grade of ground | target assisting power F (unit: N) |
| --- | --- | --- |
| $(f_2, f_1]$ | low | $F_1$ (for example, is 170) |
| $(f_3, f_2]$ | middle | $F_2$ (for example, is 160) |
| $(f_4, f_3]$ | high | $F_3$ (for example, is 150) |

It should be note that, a correspondence relationship among the threshold range, the smoothness grade of the ground and the target assisting power can be customized by the user according to the device for controlling the vehicle.

Figure 4:
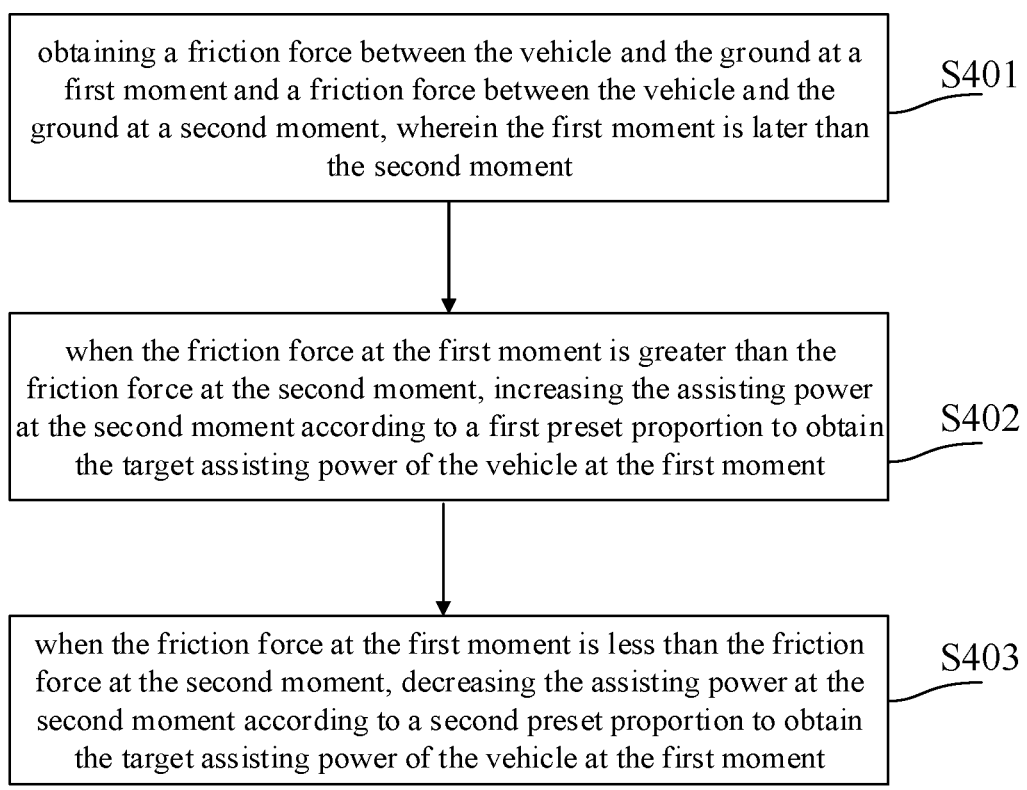
FIG. 4 is a flow chart illustrating a method for controlling a vehicle to output an assisting power according to another aspect of the disclosure.

Referring to FIG. 4, in another embodiment, a second way of determining the target assisting power, includes block S401 to block S403.

In block S401, a friction force between the vehicle and the ground at a first moment and a friction force between the vehicle and the ground at a second moment are obtained, in which, the first moment is later than the second moment.

In block S402, when the friction force at the first moment is greater than the friction force at the second moment, the assisting power at the second moment is increased according to a first preset proportion to obtain the target assisting power of the vehicle at the first moment.

In block S403, when the friction force at the first moment is less than the friction force at the second moment, the assisting power at the second moment is decreased according to a second preset proportion to obtain the target assisting power of the vehicle at the first moment.

In this embodiment, the friction force at the first moment can be compared with the friction force at the second moment, and according to a size relationship and a difference value between them, the target assisting power of the vehicle can be adjusted.

Figure 5:
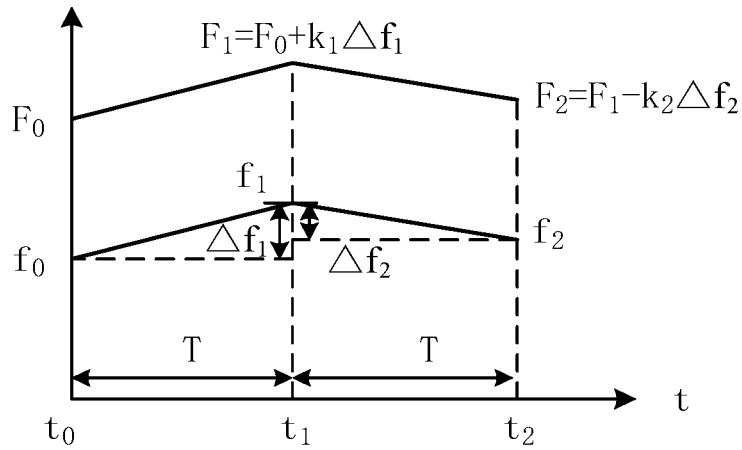
FIG. 5 is a schematic diagram illustrating a relationship between a friction force and a target assisting power according to another aspect of the disclosure.

As illustrated in FIG. 5, an initial assisting power $F_0$ at startup ($t_0=0$) of the vehicle can be preset, and a friction force $f_0$ between the vehicle and the ground is collected. After a preset time interval T ($t_1=t_0+T$), a friction force $f_1$ between the vehicle and the ground can be collected. When $f_1>f_0$, an absolute difference value $\Delta f_1=|f_1-f_0|$ of the friction forces at two moments can be obtained. According to the absolute difference value $\Delta f_1$ of the friction forces and a first preset proportion $k_1$, a change quantity $\Delta F_1=k_1\Delta f_1$ of the assisting power can be determined. The assisting power at moment t0 is increased, and the assisting power $F_1=F_0+\Delta F_1$ at moment $t_1$ can be obtained.

At moment $t_2$ ($t_2=t_1+T$), a friction force $f_2$ between the vehicle and the ground can be collected. When $f_2<f_1$, an absolute difference value $\Delta f_2=|f_2-f_1|$ of the friction forces at two moments can be obtained. According to the absolute difference value $\Delta f_2$ of the friction forces and a second preset proportion $k_2$, a change quantity $\Delta F_2=k_2\Delta f_2$ of the assisting power can be determined. The assisting power at moment $t_1$ is decreased, and the assisting power $F_2=F_1-\Delta F_0$ at moment $t_2$ can be obtained.

At moment $t_3$ ($t_3=t_2+T$), a friction force $f_3$ between the vehicle and the ground can be collected. When $f_3=f_2$, the assisting power at previous moment remains unchanged, that is, $F_3=F_2$.

In an embodiment, the first preset proportion, the second preset proportion and the time interval between the first moment and the second moment may be set by a manufacturer when the vehicle leaves a factory, or may be preset by the user on the device for controlling the vehicle. For example, the time interval between the first moment and the second moment can be set to 10 s.

Figure 6:
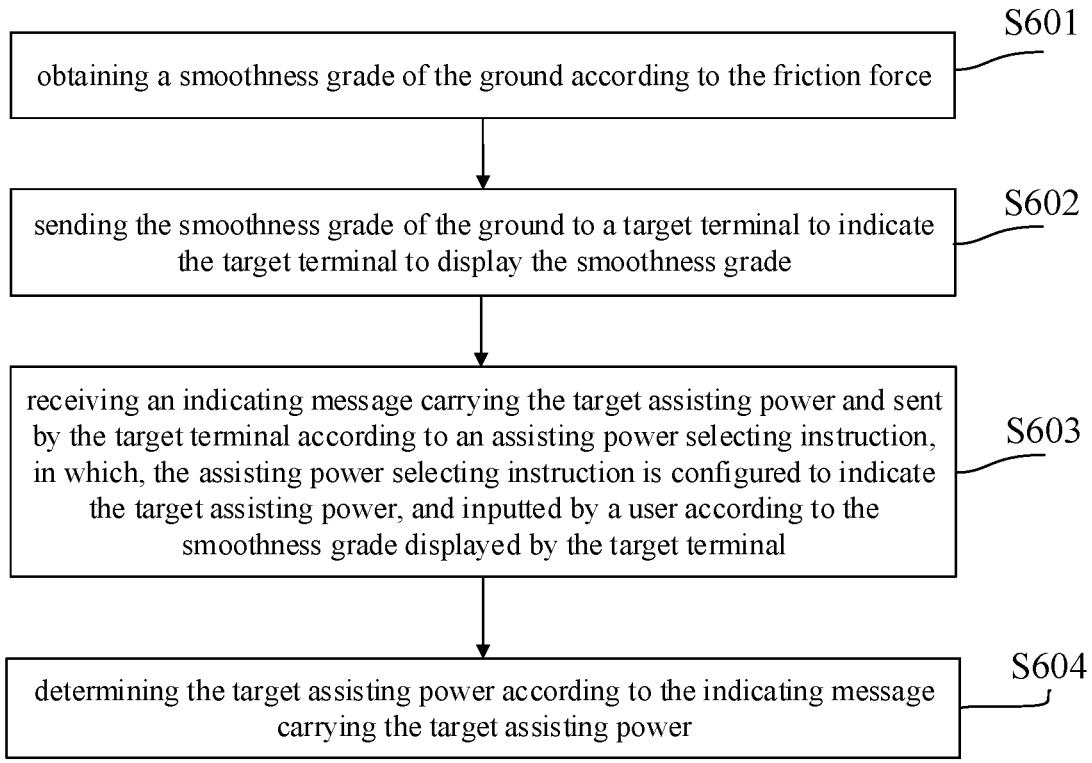
FIG. 6 is a flow chart illustrating a method for controlling a vehicle to output an assisting power according to another aspect of the disclosure.

Referring to FIG. 6, in another embodiment, a third way of determining the target assisting power, includes block S601 to block S604.

In block S601, a smoothness grade of the ground is obtained according to the friction force.

In at least one embodiment, there are three grades for the smoothness: high, middle and low. According to the obtained friction force between the vehicle and the ground, the smoothness grade of the ground corresponding to the friction force can be obtained. The method for determining the smoothness grade of the ground according to the friction force can refer to detailed descriptions of embodiments illustrated in FIG. 3, which will not be elaborated herein.

In block S602, the smoothness grade of the ground is sent to a target terminal to indicate the target terminal to display the smoothness grade. The vehicle may be paired with the target terminal and communicate with each other using wireless or wired communication.

In block S603, an indicating message carrying the target assisting power and sent by the target terminal is received according to an assisting power selecting instruction. The assisting power selecting instruction is configured to indicate the target assisting power, and inputted by a user according to the smoothness grade displayed by the target terminal.

In one or more embodiments, after the device for controlling the vehicle obtains the smoothness grade of the ground, it can send the smoothness grade of the ground to the target terminal to display. The user can adjust the target assisting power according to the smoothness grade of the ground displayed in the target terminal. Alternatively or additionally, the user may adjust the target assisting power according to his preference. That is, the user inputs the instruction configured to indicate the target assisting power at the target terminal. The target terminal generates the indicating message carrying the target assisting power according to the instruction configured to indicate the target assisting power, and sends it to the device for controlling the vehicle.

In some embodiments, the target terminal may include, but may be not limited to, such as an electronic control unit on the vehicle, a mobile phone, a tablet computer, a personal digital assistant and an intelligent wearable device. The target terminal and the device for controlling the vehicle can use various wired or wireless technologies to establish a communication connection. For example, the connection may include, but may be not limited to, Bluetooth, Wi-Fi (Wireless-Fidelity), 2G network, 3G network and 4G network.

In block S604, the target assisting power is determined according to the indicating message carrying the target assisting power.

The device for controlling the vehicle obtains the target assisting power according to the received indicating message carrying the target assisting power, and controls the motor of the vehicle to output the target assisting power according to the target assisting power.

Figure 7:
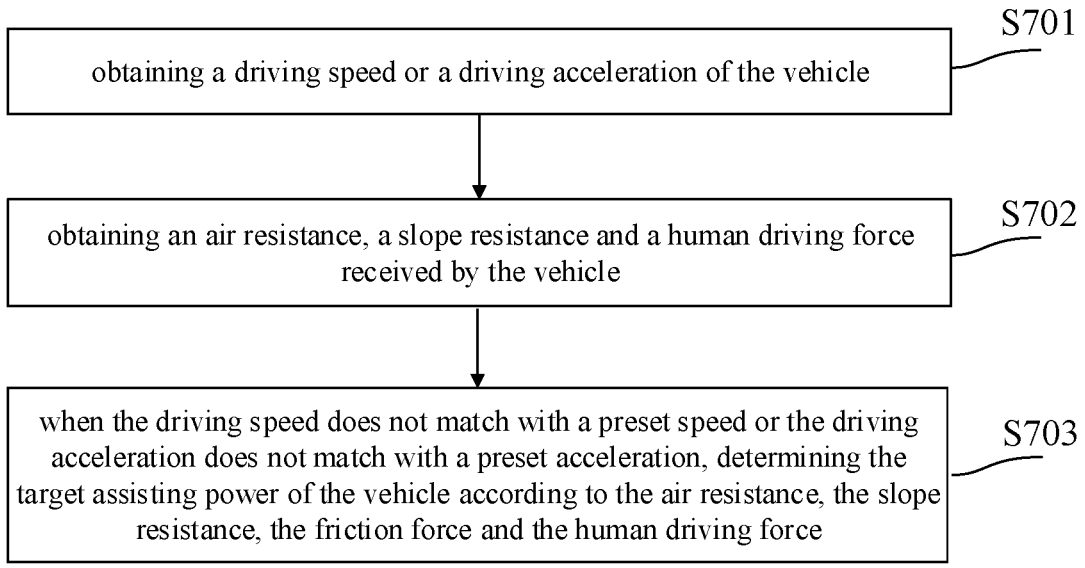
FIG. 7 is a flow chart illustrating a method for controlling a vehicle to output an assisting power according to another aspect of the disclosure.

Referring to FIG. 7, a fourth way of determining the target assisting power, includes block S701 to block S703.

In block S701, a driving speed or a driving acceleration of the vehicle is obtained.

In block S702, an air resistance, a slope resistance and a human driving force received by the vehicle are obtained.

In block S703, when the driving speed does not match with a preset speed or the driving acceleration does not match with a preset acceleration, the target assisting power of the vehicle is determined according to the air resistance, the slope resistance, the friction force and the human driving force.

When riding the vehicle, the user may set a speed so that the vehicle can run at the set speed. The driving speed of the vehicle can be detected by the speed sensor on the vehicle, and be compared with the preset speed. According to a size relationship between the driving speed and the preset speed, the power required for the vehicle is adjusted.

Taking the motorized bicycle as an example, the power required for the vehicle to reach the preset speed includes two parts, that is, the human driving force $F_{driving}$ received by the pedal when the user pedals the pedal and the assisting power $F_{assisting}$ outputted by the motor of the vehicle. The human driving force and the assisting power outputted by the motor may also need to overcome the resistance $f_{resistance}$ of the vehicle when running, such as the friction force f between the vehicle and the ground, the air resistance $f_{air}$ and the slope resistance $f_{slope}$, that is, $f_{resistance}$=$f$+$f_{air}$+$f_{slope}$.

The friction force f can be collected by the friction sensor. The air resistance $f_{air}$ is proportional to a square of the driving speed of the vehicle and a windward area of the vehicle and the user, that is, $f_{air}$=½$\rho C_d SV^2$, an in which, $\rho$ is air density, $C_d$ is an air resistance coefficient, S is the windward area of the vehicle and the user, and V is the driving speed of the vehicle. The air density $\rho$, the air resistance coefficient $C_d$ and the windward area S can be preset in the device for controlling the vehicle. Therefore, the air resistance can be calculated according to the driving speed of the vehicle.

The slope resistance $f_{slope}$ may be determined by the slope of the ground, that is, $f_{slope}$=mg sin $\theta$, in which, m is a total mass of the user and the vehicle, and can be pre-stored in a built-in memory, and $\theta$ is the slope of the ground. When the vehicle runs uphill, $f_{slope}$=mg sin $\theta$, and when the vehicle runs downhill, $f_{slope}$=–mg sin $\theta$. In an embodiment, a slope can be obtained by a slope sensor placed on the vehicle.

The driving force $F_{driving}$ may be collected by the torque sensor placed on a rear wheel of the vehicle. When riding the vehicle, the user pedals the pedal with both feet to drive a chain to rotate, so as to pull a rear axle and deform the rear axle. The torque sensor can obtain the human driving force $F_{driving}$ received by the pedal by measuring a size of deformation of the rear axle.

Therefore, the corresponding acceleration may be obtained from a preset speed curve. The target assisting power of the vehicle can be calculated according to the obtained acceleration, the driving force $F_{driving}$, the friction force f, the air resistance $f_{air}$ and the slope resistance $f_{slope}$, as described in formula (1).

$$F_{driving}+F_{assisting}-f_{resistance}=ma \quad (1)$$

The target assisting power of the vehicle is the assisting power outputted by the motor. Therefore, the corresponding control instruction may be generated according the target assisting power to control the motor to enable the vehicle to reach a target driving state.

For example, the target driving state is the vehicle reaching the preset speed and keeping running at the preset speed. In this case, the acceleration a=0, and $F_{driving}$+$F_{assisting}$– $f_{resistance}$=0. The sensors on the vehicle may detect the driving speed of the vehicle, the human driving force $F_{driving}$, the friction force f, the air resistance $f_{air}$ and the slope resistance $f_{slope}$ in real time. Thus, the terminal may adjust the target assisting power $F_{assisting}$ of the vehicle according to a detecting result in real time, so that the vehicle can keep running at the preset speed.

It should be noted that, the target driving state may be an accelerating state or a decelerating state, and the present disclosure does not limit it. For example, the target driving state may be the accelerating state according to a preset acceleration, or the decelerating state according to another preset acceleration.

Figure 8:
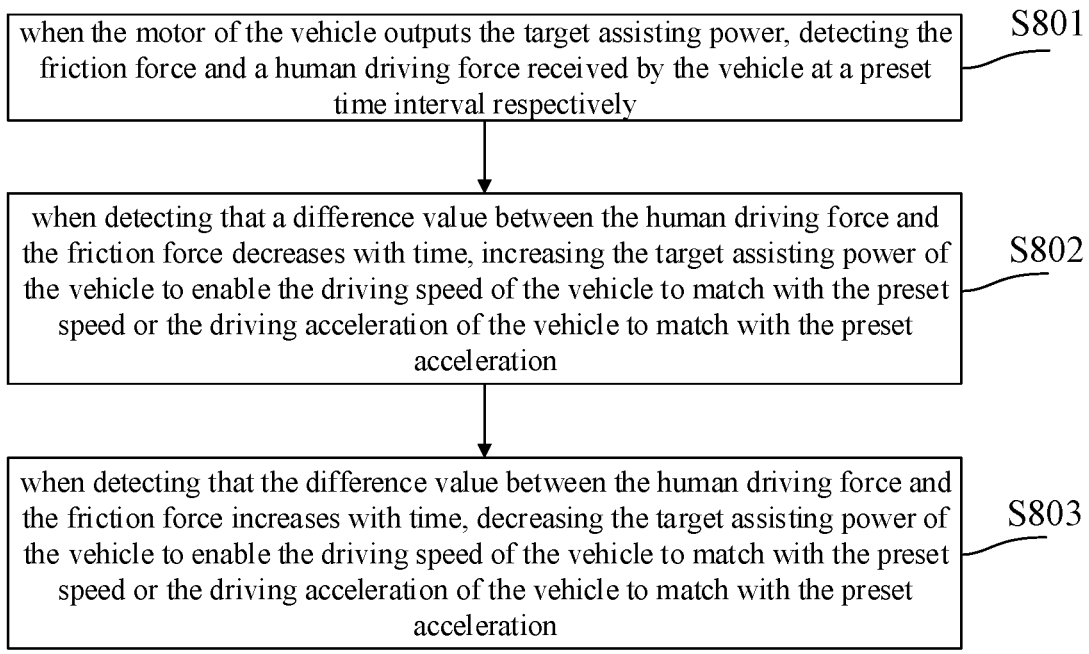
FIG. 8 is a flow chart illustrating a method for controlling a vehicle to output an assisting power according to another aspect of the disclosure.

FIG. 8 is a flow chart illustrating a method for controlling a vehicle to output an assisting power according to another aspect of the disclosure. Referring to FIG. 8, the method includes block S801 to block S803.

In block S801, when the motor of the vehicle outputs the target assisting power, the friction force and the human driving force received by the vehicle are detected at a preset time interval respectively.

In block S802, when detecting that a difference value between the human driving force and the friction force decreases with time, the target assisting power of the vehicle is increased to enable the driving speed of the vehicle to match with the preset speed or the driving acceleration of the vehicle to match with the preset acceleration.

In block S803, when detecting that the difference value between the human driving force and the friction force increases with time, the target assisting power of the vehicle is decreased to enable the driving speed of the vehicle to match with the preset speed or the driving acceleration of the vehicle to match with the preset acceleration.

When the motor of the vehicle outputs according to the target assisting power, the friction force between the vehicle and the ground may vary with different driving sections, and the human driving force provided by the user may also vary in a riding process. When the difference value between the human driving force of the user and the friction force decreases with time, and the motor still outputs according to the target assisting power at a current moment, the power of the vehicle decreases, which may cause the vehicle to be underpowered, thereby decreasing the driving speed of the vehicle. So that the preset speed cannot be reached or the preset acceleration cannot be kept, affecting the user experience. When the difference value between the human driving force of the user and the friction force increases with time, and the motor still outputs according to the target assisting power at the current moment, the power of the vehicle may be too large, so that the driving speed of the vehicle exceeds the preset speed or the acceleration exceeds the preset acceleration. The preset speed is less than a preset speed threshold (that is, a preset maximum safe driving speed) or the preset acceleration is less than a preset acceleration threshold.

Therefore, the target assisting power of the vehicle may be adjusted according to changes of the human driving force of the user and the friction force in real time. That is, when it is detected that the difference value between the human driving force of the user and the friction force decreases with time, according to amounts of the human driving force and the friction force, the target assisting power of the vehicle is increased, and the power required for the vehicle to drive at the preset speed or the preset acceleration is kept. When it is detected that the difference value between the human driving force of the user and the friction force increases with time, according to the amounts of the human driving force and the friction force, the target assisting power of the vehicle is decreased, so that the driving speed or the driving acceleration of the vehicle are decreased, thereby avoiding hidden dangers when the vehicle runs too fast because of large power, improving the safety of the vehicle, improving the cruising ability of the vehicle, and extending the service life of the battery module.

The device for controlling the vehicle can, according to the difference value between the current driving speed and the preset speed (a target speed to be reached) or the current driving acceleration and the preset acceleration (a target acceleration to be reached), calculate the power required for the vehicle to reach the preset speed or the preset acceleration, obtain the assisting power outputted by the motor according to the human driving force of the user and the friction force between the vehicle and the ground, generate a corresponding control variable, and adjust the target assisting power at the current moment, so that the assisting power outputted by the motor can allow the vehicle to run at the preset speed or the preset acceleration.

Figure 9:
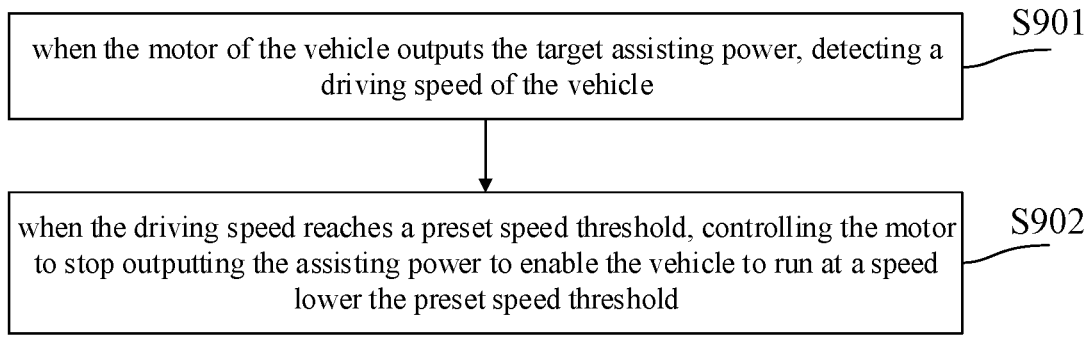
FIG. 9 is a flow chart illustrating a method for controlling a vehicle to output an assisting power according to another aspect of the disclosure.

FIG. 9 is a flow chart illustrating a method for controlling a vehicle to output an assisting power according to another aspect of the disclosure. Referring to FIG. 9, the method includes block S901 and block S902.

In block S901, when the motor of the vehicle outputs the target assisting power, the driving speed of the vehicle is detected.

In block S902, when the driving speed reaches a preset speed threshold, the motor is controlled to stop outputting the assisting power to enable the vehicle to run at a speed lower the preset speed threshold.

In an embodiment, the preset speed threshold is the maximum safe driving speed. When the motor of the vehicle outputs according to the target assisting power, considering the safety of the vehicle, it is required to collect the speed of the vehicle through the speed sensor in real time, and to determine whether the speed exceeds the preset speed threshold. When the driving speed of the vehicle reaches the preset speed threshold, if the assisting power is provided continuously, it is dangerous easily because of excessive speed of the vehicle, thereby bringing driving danger. Therefore, it is required to control the motor to stop outputting the assisting power, and adjust pedal strength (the human driving force received by the vehicle) to the pedal of vehicle by the user to control the speed, so that the driving speed is lower than the speed of the preset speed threshold, thereby improving the safety of the vehicle.

According to following embodiments of the present disclosure, there is provides a device for controlling a vehicle to output an assisting power, configured to execute the method for controlling the vehicle to output the assisting power.

Figure 10:
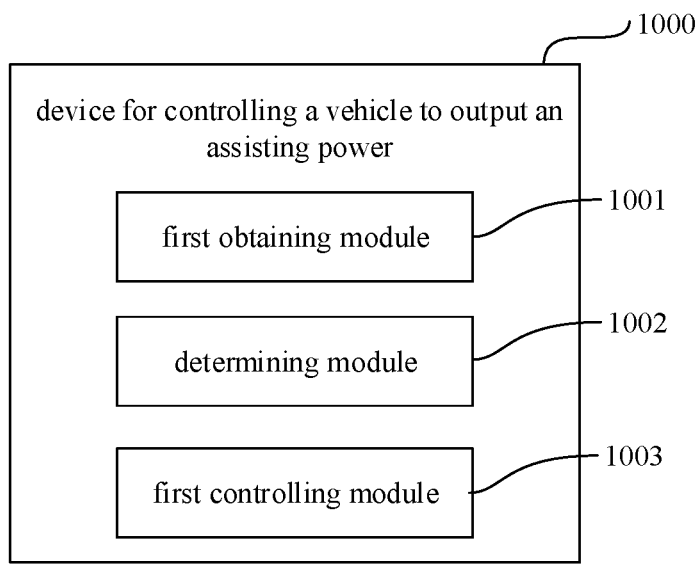
FIG. 10 is a block diagram illustrating a device for controlling a vehicle to output an assisting power according to an aspect of the disclosure.

FIG. 10 is a block diagram illustrating a device for controlling a vehicle to output an assisting power according to an aspect of the disclosure. Referring to FIG. 10, the device 1000 includes a first obtaining module 1001, a determining module 1002 and a first controlling module 1003.

The first obtaining module 1001 is configured to obtain a friction force between the vehicle and ground.

The determining module 1002 is configured to determine a target assisting power of the vehicle according to the friction force.

The first controlling module 1003 is configured to control a motor of the vehicle to output the target assisting power.

According to embodiments of the present disclosure, by obtaining the friction force between the vehicle and the ground, determining the target assisting power of the vehicle, and controlling the motor of the vehicle to output the target assisting power, it may enable the vehicle to adapt to different ground and adjust the assisting power outputted by the motor automatically. It may enable the vehicle to avoid the user from losing balance and falling down because of underpowered output when driving on the rough ground, thereby reducing hidden dangers. The motor does not need to output the large assisting power when driving on the smooth ground, thereby improving the cruising ability of the vehicle, extending the service life of the battery module, and improving the user experience.

In at least one embodiment, the determining module 1002 includes a first determining sub-module and a first obtaining sub-module.

The first determining sub-module is configured to determine a threshold range where the friction force is within.

The first obtaining sub-module is configured to obtain the target assisting power corresponding to the friction force according to the threshold range where the friction force is within and a preset correspondence between the threshold range where the friction force is within and the target assisting power.

In at least one embodiment, the determining module 1002 includes a second obtaining sub-module, a first adjusting sub-module and a second adjusting sub-module.

The second obtaining sub-module is configured to obtain a friction force between the vehicle and the ground at a first moment and a friction force between the vehicle and the ground at a second moment, in which, the first moment is later than the second moment.

The first adjusting sub-module is configured to, when the friction force at the first moment is greater than the friction force at the second moment, increase the assisting power at the second moment according to a first preset proportion to obtain the target assisting power of the vehicle at the first moment.

The second adjusting sub-module is configured to, when the friction force at the first moment is less than the friction force at the second moment, decrease the assisting power at the second moment according to a second preset proportion to obtain the target assisting power of the vehicle at the first moment.

In at least one embodiment, the determining module 1002 includes a third obtaining sub-module, a sending sub-module, a receiving sub-module and a second determining sub-module.

The third obtaining sub-module is configured to obtain a smoothness grade of the ground according to the friction force.

The sending sub-module is configured to send the smoothness grade of the ground to a target terminal to indicate the target terminal to display the smoothness grade.

The receiving sub-module is configured to receive an indicating message carrying the target assisting power and sent by the target terminal according to an assisting power selecting instruction, in which, the assisting power selecting instruction is configured to indicate the target assisting power, and inputted by a user according to the smoothness grade displayed by the target terminal.

The second determining sub-module is configured to determine the target assisting power according to the indicating message carrying the target assisting power.

In at least one embodiment, the determining module 1002 includes a fourth obtaining sub-module, a fifth obtaining sub-module and a third determining sub-module.

The fourth obtaining sub-module is configured to obtain a driving speed or a driving acceleration of the vehicle.

The fifth obtaining sub-module is configured to obtain an air resistance, a slope resistance and a human driving force received by the vehicle.

The third determining sub-module is configured to, when the driving speed does not match with a preset speed or the driving acceleration does not match with a preset acceleration, determine the target assisting power of the vehicle according to the air resistance, the slope resistance, the friction force and the human driving force.

In at least one embodiment, the device 1000 further includes a first detecting module, a first adjusting module and a second adjusting module.

The first detecting module is configured to, when the motor of the vehicle outputs the target assisting power, detect the friction force and the human driving force received by the vehicle at a preset time interval respectively.

The first adjusting module is configured to, when detecting that a difference value between the human driving force and the friction force decreases with time, increase the target assisting power of the vehicle to enable the driving speed of the vehicle to match with the preset speed or the driving acceleration of the vehicle to match with the preset acceleration.

The second adjusting module is configured to, when detecting that the difference value between the human driving force and the friction force increases with time, decrease the target assisting power of the vehicle to enable the driving speed of the vehicle to match with the preset speed or the driving acceleration of the vehicle to match with the preset acceleration.

In at least one embodiment, the device 1000 further includes a second detecting module and a second controlling module.

The second detecting module is configured to, when the motor of the vehicle outputs the target assisting power, detect the driving speed of the vehicle.

The second controlling module is configured to, when the driving speed reaches a preset speed threshold, control the motor to stop outputting the assisting power to enable the vehicle to run at a speed lower the preset speed threshold.

With respect to the devices in the above embodiments, the specific manners for performing operations for individual modules therein have been described in detail in the embodiments regarding the methods for identifying a gesture, which will not be elaborated herein.

According to embodiments of the present disclosure, there is provided a device for controlling the vehicle to output an assisting power, including a processor, and a memory configured to store instructions executable by the processor. The processor is configured to obtain a friction force between the vehicle and ground, determine a target assisting power of the vehicle according to the friction force, and control a motor of the vehicle to output the target assisting power.

According to embodiments of the present disclosure, by obtaining the friction force between the vehicle and the ground, determining the target assisting power of the vehicle, and controlling the motor of the vehicle to output the target assisting power, it may enable the vehicle to adapt to different ground and adjust the assisting power outputted by the motor automatically. It may enable the vehicle to avoid the user from losing balance and falling down because of underpowered output when driving on the rough ground, thereby reducing hidden dangers. The motor does not need to output large assisting power when driving on the smooth ground, thereby improving the cruising ability of the vehicle, extending the service life of the battery module, and improving the user experience.

According to embodiments of the present disclosure, there is provided a vehicle, including any device for controlling the vehicle to output the assisting power. For the device for controlling the vehicle to output the assisting power, it will not be elaborated herein.

Figure 11:
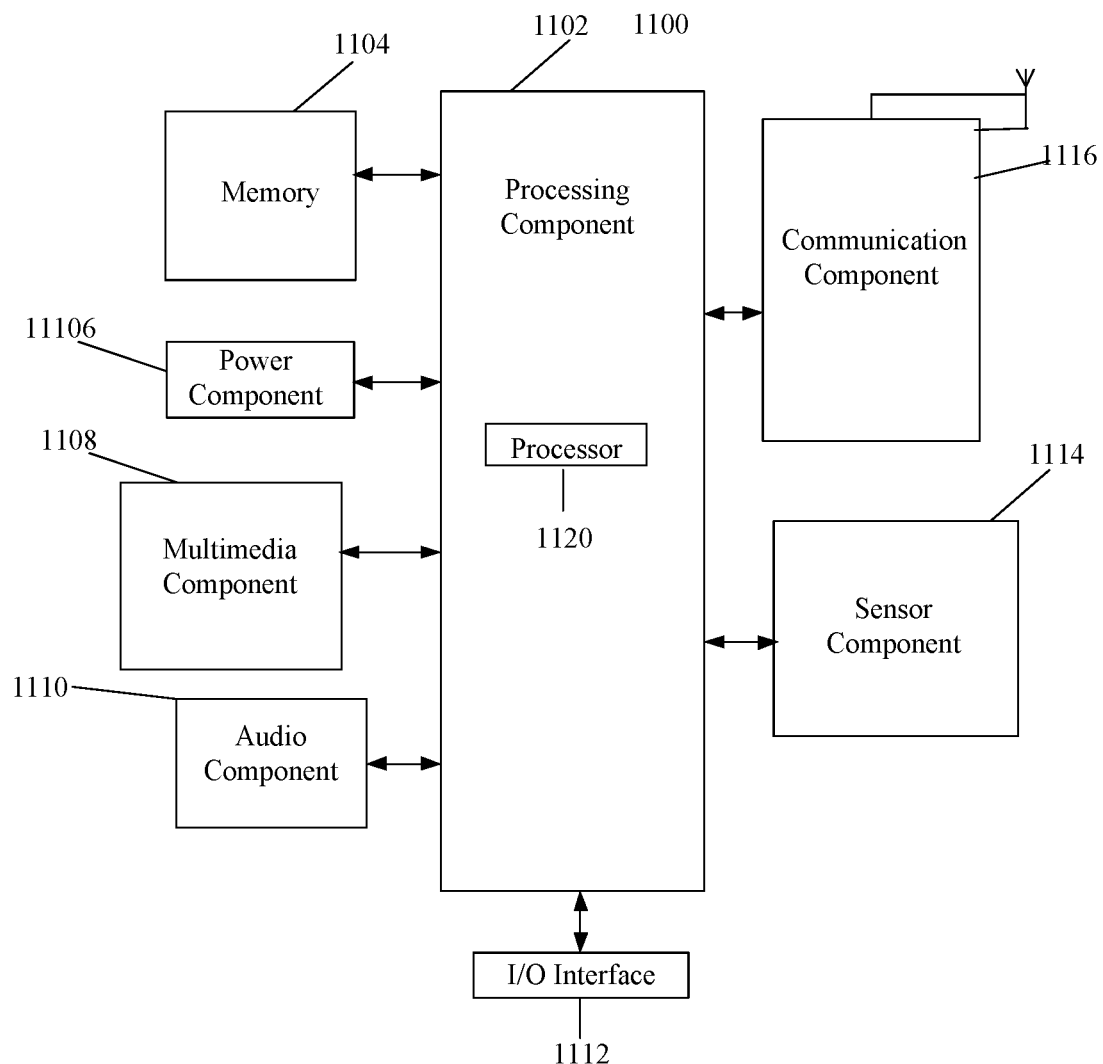
FIG. 11 is a block diagram illustrating a device for applying a method for controlling a vehicle to output an assisting power according to an aspect of the disclosure.

FIG. 11 is a block diagram illustrating a device 1100 for applying a method for controlling a vehicle to output an assisting power according to an aspect of the disclosure. Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front-facing camera and/or a rear-facing camera. When the device 1100 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G or 3G or a combination thereof. In one aspect of the disclosure, the communication component 1116 receives a broadcast signal or broadcast associated information from an external broadcast management system via a broadcast channel. In one aspect of the disclosure, the communication component 1116 further includes a near field communication (NFC for short) module to facilitate short-range communications. For example, the NFC module may be implemented based on a radio frequency identification (RFID for short) technology, an infrared data association (IrDA short) technology, an ultra-wideband (UWB for short) technology, a Bluetooth (BT for short) technology, and other technologies.

In aspect of the disclosures, the device 1100 may be implemented with one or more application specific integrated circuits (ASICs for short), digital signal processors (DSPs), digital signal processing devices (DSPDs for short), programmable logic devices (PLDs for short), field programmable gate arrays (FPGAs for short), controllers, micro-controllers, microprocessors, or other electronic components, for performing the methods described above.

In aspect of the disclosures, there is also provided a non-transitory computer-readable storage medium including instructions, such as included in the memory 1104, executable by the processor 1120 in the device 1100, for performing the above-described methods. For example, the non-transitory computer-readable storage medium may be a read-only memory (ROM for short), a random access memory (RAM for short), a CD-ROM, a magnetic tape, a floppy disk, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling a vehicle to output an assisting power, comprising:
   obtaining a friction force between the vehicle and ground;
   determining a target assisting power of the vehicle according to the friction force;
   controlling a motor of the vehicle to output the target assisting power;
   when the motor of the vehicle outputs the target assisting power, detecting a driving speed of the vehicle; and
   when the driving speed reaches a preset speed threshold, controlling the motor to stop outputting the assisting power to enable the vehicle to run at a speed lower than the preset speed threshold.

2. The method according to claim 1, wherein determining the target assisting power of the vehicle according to the friction force comprises:
   determining a threshold range where the friction force is within; and
   obtaining the target assisting power corresponding to the friction force according to the threshold range and a preset correspondence between stored threshold ranges and stored target assisting powers.

3. The method according to claim 2, further comprising:
   when the motor of the vehicle outputs the target assisting power, detecting the friction force and a human driving force received by the vehicle at a preset time interval;
   when detecting that a difference value between the human driving force and the friction force decreases with time, increasing the target assisting power of the vehicle to enable a driving speed of the vehicle to match with a preset speed or a driving acceleration of the vehicle to match with a preset acceleration; and
   when detecting that the difference value between the human driving force and the friction force increases with time, decreasing the target assisting power of the vehicle to enable the driving speed of the vehicle to match with the preset speed or the driving acceleration of the vehicle to match with the preset acceleration.

4. The method according to claim 1, wherein determining the target assisting power of the vehicle according to the friction force comprises:
   obtaining a friction force between the vehicle and the ground at a first moment and a friction force between the vehicle and the ground at a second moment, wherein the first moment is later than the second moment;

when the friction force at the first moment is greater than the friction force at the second moment, increasing the assisting power at the second moment according to a first preset proportion to obtain the target assisting power of the vehicle at the first moment; and when the friction force at the first moment is less than the friction force at the second moment, decreasing the assisting power at the second moment according to a second preset proportion to obtain the target assisting power of the vehicle at the first moment.

5. The method according to claim 1, wherein determining the target assisting power of the vehicle according to the friction force comprises:

obtaining a smoothness grade of the ground according to the friction force;

sending the smoothness grade of the ground to a target terminal to indicate the target terminal to display the smoothness grade;

receiving an indicating message carrying the target assisting power and sent by the target terminal according to an assisting power selecting instruction, wherein the assisting power selecting instruction indicates the target assisting power inputted by a user according to the smoothness grade displayed by the target terminal; and determining the target assisting power according to the indicating message.

6. The method according to claim 1, wherein determining a target assisting power of the vehicle according to the friction force comprises:

obtaining a driving speed or a driving acceleration of the vehicle;

obtaining an air resistance, a slope resistance, and a human driving force received by the vehicle; and when the driving speed does not match with a preset speed or the driving acceleration does not match with a preset acceleration, determining the target assisting power of the vehicle according to the air resistance, the slope resistance, the friction force, and the human driving force.

7. A device for controlling a vehicle to output an assisting power, comprising:

a processor;

a memory, configured to store instructions executable by the processor;

wherein, the processor is configured to:

obtain a friction force between the vehicle and ground;

determine a target assisting power of the vehicle according to the friction force;

control a motor of the vehicle to output the target assisting power;

when the motor of the vehicle outputs the target assisting power, detect a driving speed of the vehicle; and when the driving speed reaches a preset speed threshold, control the motor to stop outputting the assisting power to enable the vehicle to run at a speed lower than the preset speed threshold.

8. The device according to claim 7, wherein the processor is configured to determine the target assisting power of the vehicle according to the friction force by acts of:

determining a threshold range where the friction force is within; and obtaining the target assisting power corresponding to the friction force according to the threshold range and a preset correspondence between stored threshold ranges and stored target assisting powers.

9. The device according to claim 8, wherein the processor is further configured to:

when the motor of the vehicle outputs the target assisting power, detect the friction force and a human driving force received by the vehicle at a preset time interval;

when detecting that a difference value between the human driving force and the friction force decreases with time, increase the target assisting power of the vehicle to enable a driving speed of the vehicle to match with a preset speed or a driving acceleration of the vehicle to match with a preset acceleration; and when detecting that the difference value between the human driving force and the friction force increases with time, decrease the target assisting power of the vehicle to enable the driving speed of the vehicle to match with the preset speed or the driving acceleration of the vehicle to match with the preset acceleration.

10. The device according to claim 7, wherein the processor is configured to determine the target assisting power of the vehicle according to the friction force by acts of:

obtaining a friction force between the vehicle and the ground at a first moment and a friction force between the vehicle and the ground at a second moment, wherein the first moment is later than the second moment;

when the friction force at the first moment is greater than the friction force at the second moment, increasing the assisting power at the second moment according to a first preset proportion to obtain the target assisting power of the vehicle at the first moment; and when the friction force at the first moment is less than the friction force at the second moment, decreasing the assisting power at the second moment according to a second preset proportion to obtain the target assisting power of the vehicle at the first moment.

11. The device according to claim 7, wherein the processor is configured to determine the target assisting power of the vehicle according to the friction force by acts of:

obtaining a smoothness grade of the ground according to the friction force;

sending the smoothness grade of the ground to a target terminal to indicate the target terminal to display the smoothness grade;

receiving an indicating message carrying the target assisting power and sent by the target terminal according to an assisting power selecting instruction, wherein the assisting power selecting instruction indicates the target assisting power inputted by a user according to the smoothness grade displayed by the target terminal; and determining the target assisting power according to the indicating message.

12. The device according to claim 7, wherein the processor is configured to determine the target assisting power of the vehicle according to the friction force by acts of:

obtaining a driving speed or a driving acceleration of the vehicle;

obtaining an air resistance, a slope resistance and a human driving force received by the vehicle; and when the driving speed does not match with a preset speed or the driving acceleration does not match with a preset acceleration, determining the target assisting power of the vehicle according to the air resistance, the slope resistance, the friction force and the human driving force.

13. A non-transitory computer-readable storage medium having stored therein instructions that, when executed by a processor of a terminal, causes the terminal to perform a method for controlling a vehicle to output an assisting power, which comprises:

obtaining a friction force between the vehicle and ground;

determining the target assisting power of the vehicle according to the friction force;

controlling a motor of the vehicle to output the target assisting power;

when the motor of the vehicle outputs the target assisting power, detecting a driving speed of the vehicle; and when the driving speed reaches a preset speed threshold, controlling the motor to stop outputting the assisting power to enable the vehicle to run at a speed lower than the preset speed threshold.

14. The non-transitory computer-readable storage medium according to claim 13, wherein determining the target assisting power of the vehicle according to the friction force comprises:

determining a threshold range where the friction force is within; and obtaining the target assisting power corresponding to the friction force according to the threshold range and a preset correspondence between stored threshold ranges and stored target assisting powers.

15. The non-transitory computer-readable storage medium according to claim 14, wherein the method further comprises:

when the motor of the vehicle outputs the target assisting power, detecting the friction force and a human driving force received by the vehicle at a preset time interval;

when detecting that a difference value between the human driving force and the friction force decreases with time, increasing the target assisting power of the vehicle to enable a driving speed of the vehicle to match with a preset speed or a driving acceleration of the vehicle to match with a preset acceleration; and when detecting that the difference value between the human driving force and the friction force increases with time, decreasing the target assisting power of the vehicle to enable the driving speed of the vehicle to match with the preset speed or the driving acceleration of the vehicle to match with the preset acceleration.

16. The non-transitory computer-readable storage medium according to claim 13, wherein determining the target assisting power of the vehicle according to the friction force comprises:

obtaining a friction force between the vehicle and the ground at a first moment and a friction force between the vehicle and the ground at a second moment, wherein the first moment is later than the second moment;

when the friction force at the first moment is greater than the friction force at the second moment, increasing the assisting power at the second moment according to a first preset proportion to obtain the target assisting power of the vehicle at the first moment; and when the friction force at the first moment is less than the friction force at the second moment, decreasing the assisting power at the second moment according to a second preset proportion to obtain the target assisting power of the vehicle at the first moment.

17. The non-transitory computer-readable storage medium according to claim 13, wherein determining the target assisting power of the vehicle according to the friction force comprises:

obtaining a smoothness grade of the ground according to the friction force;

sending the smoothness grade of the ground to a target terminal to indicate the target terminal to display the smoothness grade;

receiving an indicating message carrying the target assisting power and sent by the target terminal according to an assisting power selecting instruction, wherein, the assisting power selecting instruction is configured to indicate the target assisting power, and inputted by a user according to the smoothness grade displayed by the target terminal; and determining the target assisting power according to the indicating message.

18. The non-transitory computer-readable storage medium according to claim 13, wherein determining the target assisting power of the vehicle according to the friction force comprises:

obtaining a driving speed or a driving acceleration of the vehicle;

obtaining an air resistance, a slope resistance and a human driving force received by the vehicle; and when the driving speed does not match with a preset speed or the driving acceleration does not match with a preset acceleration, determining the target assisting power of the vehicle according to the air resistance, the slope resistance, the friction force and the human driving force.

* * * * *